United States Patent
Scekic et al.

(10) Patent No.: US 10,309,169 B2
(45) Date of Patent: Jun. 4, 2019

(54) SPINNER WRENCH FOR A DRILLING RIG

(71) Applicant: DRILLFORM TECHNICAL SERVICES LTD., Calgary (CA)

(72) Inventors: Vladimir Scekic, New Westminster (CA); Todd McCorriston, Calgary (CA); Patrick McDougall, Calgary (CA)

(73) Assignee: DRILLFORM TECHNICAL SERVICES LTD., Calgary (CA)

( * ) Notice: Subject to any disclaimer, the term of this patent is extended or adjusted under 35 U.S.C. 154(b) by 365 days.

(21) Appl. No.: 15/111,903

(22) PCT Filed: Jan. 16, 2015

(86) PCT No.: PCT/CA2015/000029
§ 371 (c)(1),
(2) Date: Jul. 15, 2016

(87) PCT Pub. No.: WO2015/106344
PCT Pub. Date: Jul. 23, 2015

(65) Prior Publication Data
US 2016/0340989 A1    Nov. 24, 2016

Related U.S. Application Data

(60) Provisional application No. 61/928,888, filed on Jan. 17, 2014.

(51) Int. Cl.
*E21B 19/16* (2006.01)
*B23P 19/10* (2006.01)
(Continued)

(52) U.S. Cl.
CPC .......... *E21B 19/168* (2013.01); *B21D 39/046* (2013.01); *B23P 19/107* (2013.01);
(Continued)

(58) Field of Classification Search
CPC .... E21B 19/161; E21B 19/163; E21B 19/164; E21B 19/168; Y10T 29/49881; B21D 39/046
See application file for complete search history.

(56) References Cited

U.S. PATENT DOCUMENTS

| 3,507,174 A | 4/1970 | Dickmann |
| 3,919,902 A | 11/1975 | Johnson |

(Continued)

FOREIGN PATENT DOCUMENTS

| CA | 2465530 | 3/2004 |
| CA | 2679698 A1 | 9/2008 |

(Continued)

OTHER PUBLICATIONS

International Preliminary Patentability Report for International (PCT) Patent Application No. PCT/CA2015/000029, dated Jul. 28, 2016, 5 pages.

(Continued)

*Primary Examiner* — Jermie E Cozart
(74) *Attorney, Agent, or Firm* — Sheridan Ross PC

(57) ABSTRACT

A spinner wrench for use on a drilling rig is provided. In some embodiments, the wrench can comprise three or more spinning rollers that can be disposed around a tubular. The three or more rollers can be connected to three or more hydraulic rams. In some embodiments, each ram can be connected to a single roller and the axis of the ram can be in a plane perpendicular to the pipe axis but not intersecting the pipe axis. For improved performance during make-up, in planar view, each ram axis can be offset to a counterclockwise direction around the drill pipe axis. For improved performance during break-out, in planar view, each ram axis can be offset to the clockwise direction. In some embodiments, the three or more rollers can be disposed around the (Continued)

drilling pipe or other tubular by a main body and one or more latching bodies.

20 Claims, 9 Drawing Sheets

(51) Int. Cl.
  B21D 39/04  (2006.01)
  B23P 19/06  (2006.01)
(52) U.S. Cl.
  CPC .......... *E21B 19/161* (2013.01); *E21B 19/163* (2013.01); *E21B 19/164* (2013.01); *B23P 19/061* (2013.01); *Y10T 29/49881* (2015.01)

(56) References Cited

U.S. PATENT DOCUMENTS

| | | | |
|---|---|---|---|
| 4,372,026 A * | 2/1983 | Mosing | E21B 19/164 29/426.5 |
| 4,765,401 A | 8/1988 | Boyadjieff | |
| 5,060,542 A | 10/1991 | Hauk | |
| 5,092,399 A | 3/1992 | Lang | |
| 6,142,041 A | 11/2000 | Buck | |
| 6,318,214 B1 | 11/2001 | Buck | |
| 7,707,914 B2 | 5/2010 | Pietras et al. | |
| 8,020,626 B2 * | 9/2011 | Francis | B23P 19/069 166/380 |
| 2009/0255662 A1 * | 10/2009 | Ge | E21B 19/164 166/77.51 |
| 2011/0030512 A1 | 2/2011 | Begnaud, Jr. | |
| 2016/0102509 A1 | 4/2016 | Scekic et al. | |

FOREIGN PATENT DOCUMENTS

| | | |
|---|---|---|
| CA | 2773295 | 10/2013 |
| EP | 1517000 | 3/2005 |
| GB | 2400389 | 10/2004 |
| GB | 2433954 A | 7/2007 |
| WO | WO 2011/060270 | 5/2011 |

OTHER PUBLICATIONS

International Search Report and Written Opinion prepared by the Canadian Intellectual Property Office dated Apr. 7, 2015, for International Application No. PCT/CA2015/000029.

International Search Report and Written Opinion for International (PCT) Patent Application No. PCT/CA2014/000401, dated Jul. 22, 2014, 8 pages.

European Search Report and Opinion for European Patent Application No. 14794384, dated Dec. 15, 2016, 8 pages.

Official Action for U.S. Appl. No. 14/889,398, dated Nov. 2, 2017, 11 pages.

Official Action for U.S. Appl. No. 14/889,398, dated Jul. 10, 2018, 12 pages.

* cited by examiner $L = r_{pipe} + r_{roller}$ $\sum M_A = 0 \rightarrow F_p L \sin \theta = R_{C_y} L \cos \theta$ $R_{C_y} = F_p (\sin \theta / \cos \theta) = F_p \tan \theta$ For 0° < θ < 90°:

$F_{cl} = \left[ F_p^2 + R_{C_y}^2 \right]^{1/2} = \left[ F_p^2 + (F_p \tan \theta)^2 \right]^{\frac{1}{2}} > F_p$

SPINNER WRENCH FOR A DRILLING RIG

CROSS REFERENCE TO RELATED APPLICATIONS

This application is a national stage application under 35 U.S.C. 371 and claims the benefit of PCT Application No. PCT/CA2015/000029 having an international filing date of 16 Jan. 2015, which designated the United States, which PCT application claimed the benefit of U.S. Provisional Application No. 61/928,888 filed 17 Jan. 2014, the disclosures of each of which are incorporated herein by reference.

TECHNICAL FIELD

The present disclosure is related to the field of spinner wrenches for use on a drilling rig.

BACKGROUND

Automated floor wrenches, and in particular spinner wrenches, for drilling rigs are known. These existing devices do have, however, deficiencies and shortcomings. Most devices are known to have two hydraulic rams opposed to each other, each ram pushing against a pair of spinning rollers to contact, grip and spin the drilling pipe or other tubular. The spinning torque is transferred from the spinning roller to the pipe by means of tangential friction force which is, by definition determined by a coefficient of friction and the resulting gripping forces acting along the lines connecting centers of each roller and the drilling pipe.

A problem with previous devices is that, depending on the direction of spinning the tubular (make-up or break-out), a component of the tangential force associated with active torque will either be positive or negative relative to the gripping force produced by the hydraulic ram. If positive, the "active force" will add-up to the "ram force" and the roller will have good grip with the pipe. If negative, the quality of grip will be diminished and the roller may slip under high torque. Of the two rollers on the single ram, one will always have good grip in the direction of make-up while the other will have good grip in the direction of the break-out, the other roller of the pair will likely not have a good grip.

Maximum spinner torque will typically be determined by the resulting friction force of the two rollers, one on each opposing ram, with unfavourable sum of the forces produced by hydraulic ram and by active torque.

It is, therefore, desirable to provide an automated spinner wrench for a drilling rig that overcomes the shortcomings of prior art devices.

SUMMARY

A spinner wrench for use on a drilling rig is provided. In some embodiments, the wrench can comprise three or more spinning rollers that can be disposed around a drilling pipe or other tubular. The three or more rollers can be connected to three or more hydraulic rams. In some embodiments, each ram can be connected to a single roller and the axis of the ram can be in a plane perpendicular to the pipe axis but not intersecting the pipe axis. For improved performance during make-up, in planar view, each ram axis can be offset to a counterclockwise direction around the drill pipe axis. For improved performance during break-out, in planar view, each ram axis can be offset to the clockwise direction. In some embodiments, the three or more rollers can be disposed around the drilling pipe or other tubular by a main body and one or more latching bodies, each of the rollers can be separately connected to one of the three or more hydraulic rams.

Broadly speaking, in some embodiments a spinner wrench is provided for use to spin a drill pipe or other tubular, the wrench comprising: three or more powered rollers; each of the rollers configured to be pushed into contact with the drill pipe or other tubular by a dedicated ram; the axes of the dedicated rams being in a plane perpendicular to the drill pipe axis but not intersecting the axis of the drill pipe or other tubular; and the rollers disposed in such a way that the contact between each powered roller and the drill pipe or other tubular is offset of the respective ram axis.

In some embodiments, the ram axes are fixedly determined at manufacturing and are offset in such a way to provide a counter clockwise or a clockwise arrangement. In some embodiments, the ram axes are pivotable around axes parallel to a longitudinal axis of the drill pipe or other tubular thus configured to assume either a counter clockwise or clockwise arrangement in relation to the axis of the drill pipe or other tubular. In some embodiments, the pivoting movement is allowed by design and initiated by friction between the spinning roller and the drill pipe. In some embodiments, the pivoting movement is initiated by a dedicated actuator. In some embodiments, the rollers are configured surround the drill pipe. In some embodiments, the spinner wrench further comprises a roller assembly which comprises a roller frame to mount the powered rollers, the roller frame configured for moving the powered rollers away from each other to receive a section of drill pipe or other tubular and for moving the powered rollers towards each other and contacting the section of drill pipe or other tubular to spin it. In some embodiments, each powered roller comprises a hydraulic motor operatively coupled to an input of a gearbox, and a roller wheel operatively coupled to an output of the gearbox for spinning the powered roller. In some embodiments, the spinner wrench further comprises a latch mechanism to releasably allow the rollers to surround the drill pipe.

Broadly speaking, in some embodiments a method is provided for spinning a drill pipe or other tubular, the method comprising: surrounding the drill pipe or other tubular with a spinning wrench, the spinning wrench comprising three or more powered rollers, each of the rollers configured to be pushed into contact with the drill pipe or other tubular, by a dedicated ram, the axes of the dedicated rams being in a plane perpendicular a longitudinal axis of the drill pipe or other tubular but not intersecting the longitudinal axis of the drill pipe or other tubular; offsetting the axes of the dedicated rams prior to, or during, contact of at least one powered roller and the drill pipe or other tubular; extending at least one dedicated ram so as to contact at least one powered roller to the drill pipe or other tubular; activating at least one powered roller in contact with the drill pipe or other tubular; and spinning the drill pipe or other tubular using the rotation of the at least one powered roller.

In some embodiments, the method can further comprise spinning the drill pipe or other tubular to form a joint between sections of tubulars during make-up, or breaking a joint between sections of tubulars during break-out. In some embodiments, the method can further comprise using a tong assembly for torqueing the joint together during make-up, or for uncoupling the joint during break-out. In some embodiments, in planar view, the axes of the dedicated rams are offset to a counter-clock-wise direction for make-up and to a clock-wise direction for break-out of the drill pipe or other tubulars. In some embodiments, in planar view, the axes of the dedicated rams are offset to a clock-wise direction for make-up and to a counter-clock-wise direction for break-out of the drill pipe or other tubulars having reverse threads. In some embodiments, each ram is configured to pivot around an axis parallel to the pipe axis. In some embodiments, the method can further comprise feeding the drill pipe or other tubular into the spinner wrench from above or below. In some embodiments, the method can further comprise opening the spinner wrench to position the spinner wrench around the drill pipe or other tubular from the side. In some embodiments, opening the spinner wrench comprises unlatching a latch on the spinner wrench and swinging at least one latching body away from a main body on a pivot pin. In some embodiments, the method can further comprise closing the spinner wrench around the drill pipe or other tubular by swinging the at least one latching body towards the main body on the pivot pin.

DETAILED DESCRIPTION OF EMBODIMENTS

A spinner wrench is provided. In some embodiments, the spinner wrench can comprise three or more rollers, for example four rollers, which can be equally disposed around the circumference of a drilling pipe or other tubular, each of the rollers can be connected to one of three or more hydraulic rams, for example four rams. The spinner wrench can include at least three motorized spinners that can spin an upper pipe to form a joint with a lower pipe prior to torqueing the joint together (make-up), or for uncoupling the upper pipe after the joint is broken (break-out). The axis of each ram can be offset or able to pivot around an axis parallel to the pipe axis such that, in planar view, each ram axis can be offset to the "counter-clock-wise" direction for make-up and to the "clock-wise" direction for break-out of drilling pipe.

Figure 1:
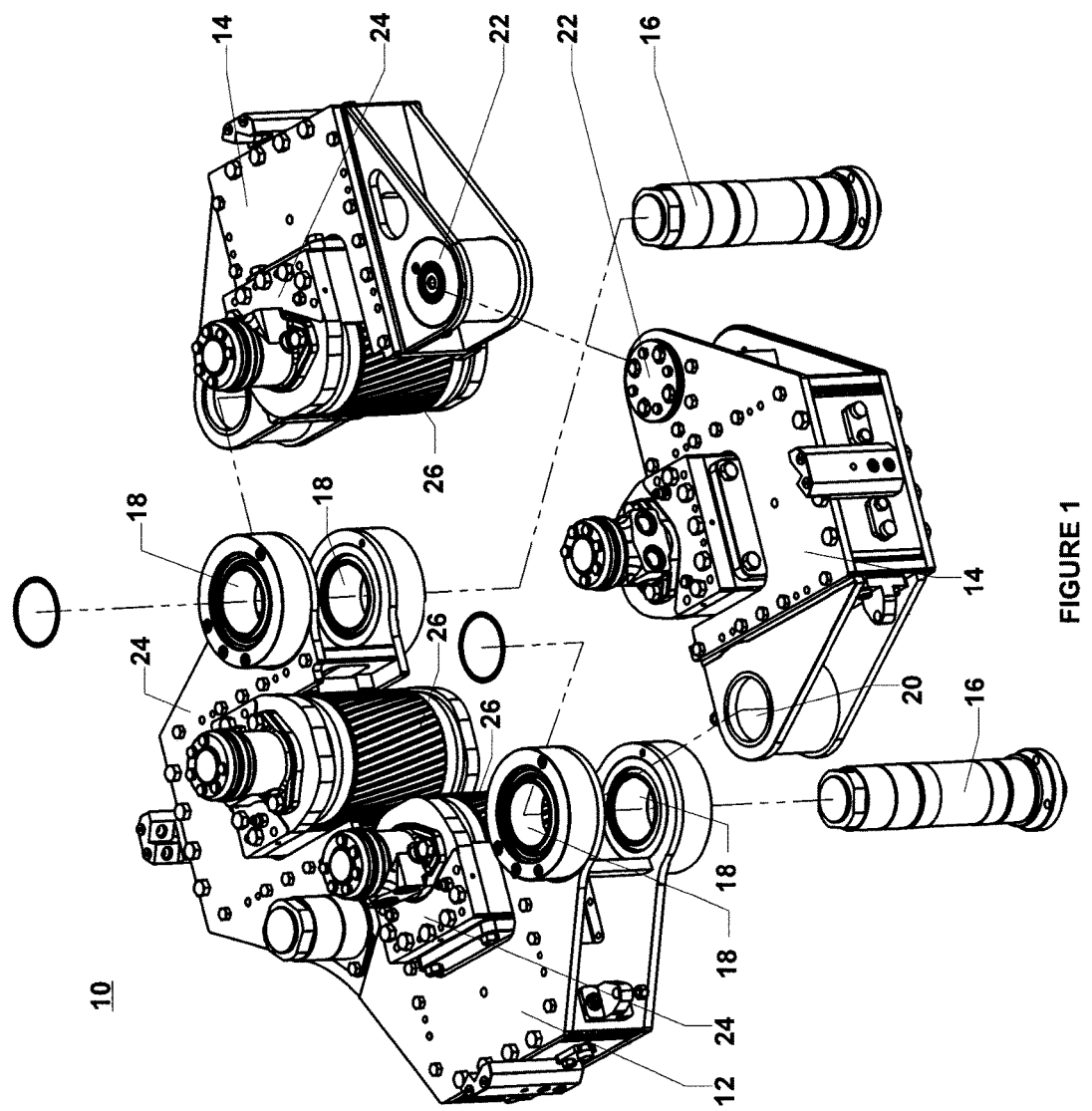
FIG. 1 depicts an exploded isometric view of an embodiment of a spinner wrench with non-pivoting rams oriented for making-up a pipe connection. Dashed lines indicate the interconnections of components during assembly.
Figure 2:
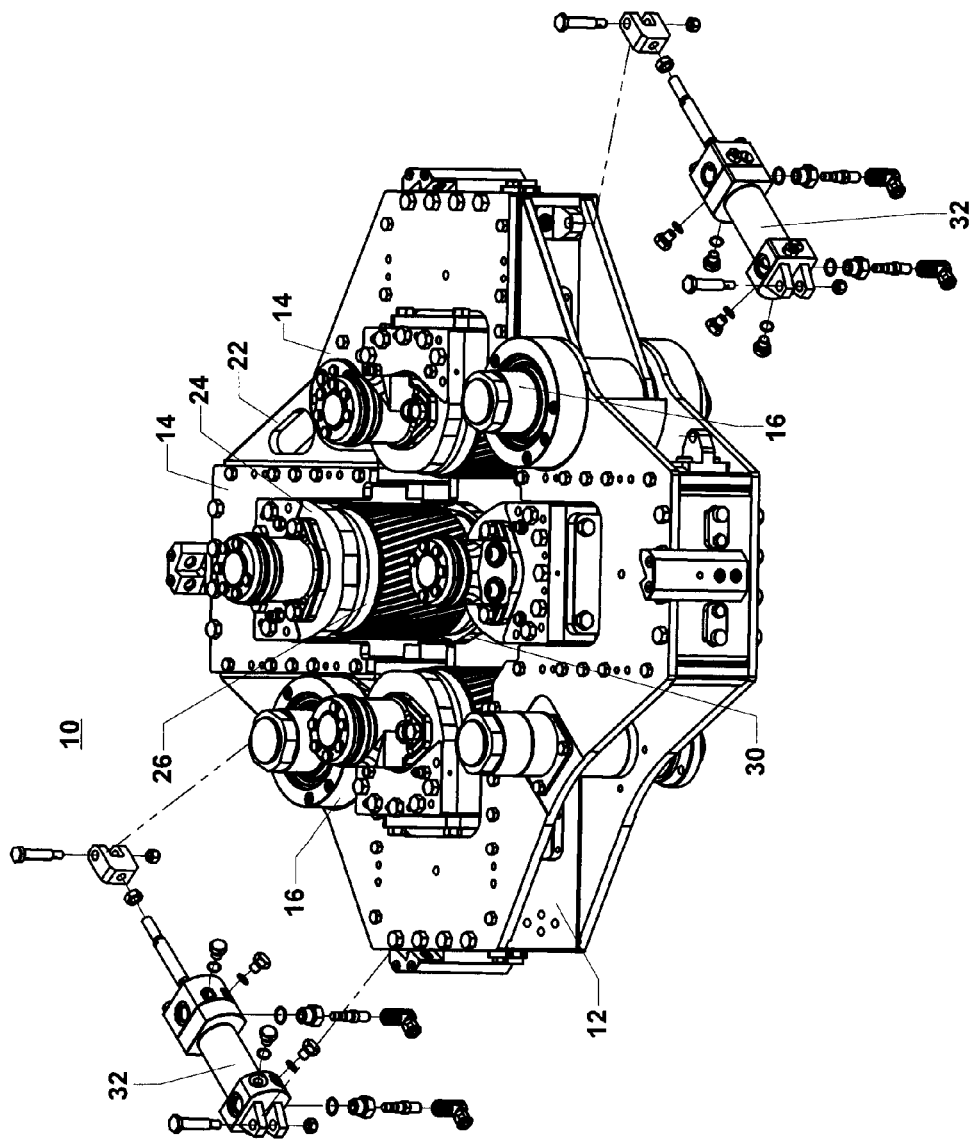
FIG. 2 depicts an isometric view of an embodiment of an assembled spinner wrench without a pipe depicted. Dashed lines indicate the interconnections of components during assembly.

Referring to FIG. 1 and FIG. 2, spinner wrench 10 can comprise a main body 12 and one or more latching bodies 14. In some embodiments, latching body 14 can be attached to main body 12 by feeding pin 16 through main body aperture 18 and latching body aperture 20 when apertures 18 and 20 are aligned. Pin 16 can allow latch body to pivot in relation to main body 12. In some embodiments, latching body 14 can be reversibly connected to a second, or further, latching body 14 by means of latch 22.

Main body and/or latching body 14 can comprise a roller assembly 24 which can include powered roller(s) 26 to spin a drill pipe 28 (not shown in FIG. 1) encompassed by spinner wrench 10. In some embodiments, spinner wrench 10 can comprise three or four roller assemblies 24. As depicted in FIG. 2, when spinner wrench is latched, an opening 30 is created for drill pipe 28 (drill pipe 28 not shown in FIG. 2). Drill pipe 28 can be fed into spinner wrench 10 from above or below, however, spinner wrench 10 can also be opened by unlatching latch 22 and swinging latching body or bodies 14 away from main body 12 on pivot pins 16. Spinner wrench 10 can then be positioned to encompass drill pipe 28 in opening 30, following which, latching body or bodies 14 can then be swung on pivot pins 16 towards main body 12 to encompass drill pipe 28 and latch 22 can be closed.

Figure 3A:
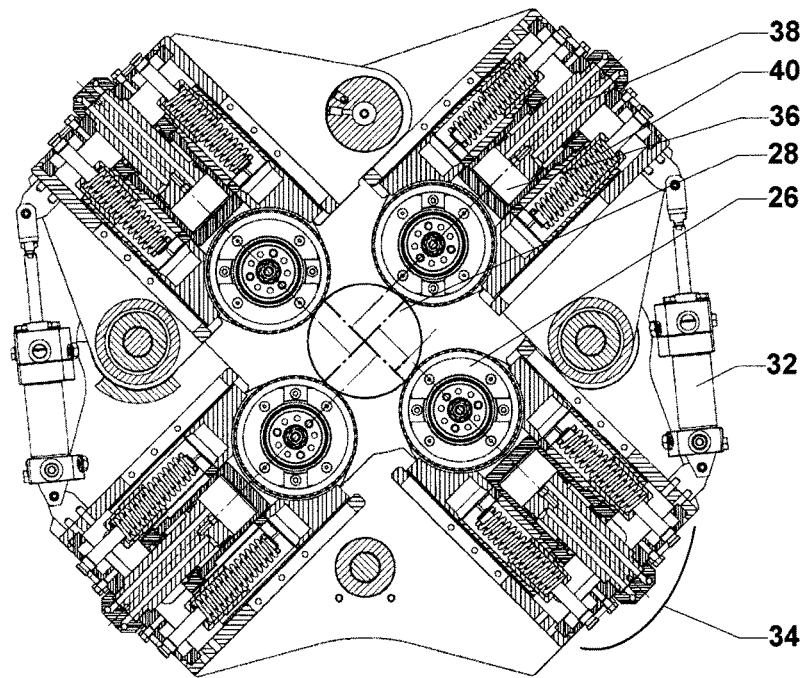
FIG. 3A depicts a top, sectional, view of an embodiment of a spinner wrench with non-pivoting rams oriented for making-up a pipe connection, where the pipe is depicted.
Figure 3B:
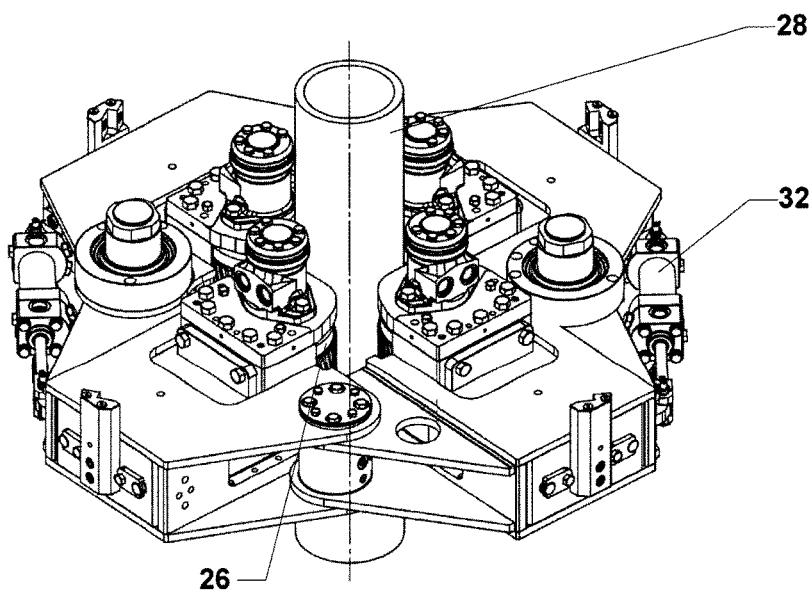
FIG. 3B depicts an isometric view of an embodiment of the spinner wrench of FIG. 3A.

Referring now to FIGS. 3A and 3B, an embodiment of a spinner wrench 10 is shown where powered rollers 26 can be equally disposed around the circumference of drill-pipe 28 thru action of closing cylinders 32. Each roller 26 can be offset in counter-clock-wise direction relative to the drill-pipe 28. An example of the offset is represented by character D. A static clamping force for each roller 26 can be provided by a ramming assembly 34 comprising a hydraulic cylinder 36 moving along a piston 38. Even clamping can be assisted by providing springs 40. In this embodiment, preferred performance of the spinner wrench 10 is provided for make-up of a pipe connection. For break-out, in planar view, each ram axis can be offset to the clock-wise direction (not shown), and the rollers and tubular would spin in the opposite directions.

Figure 4A:
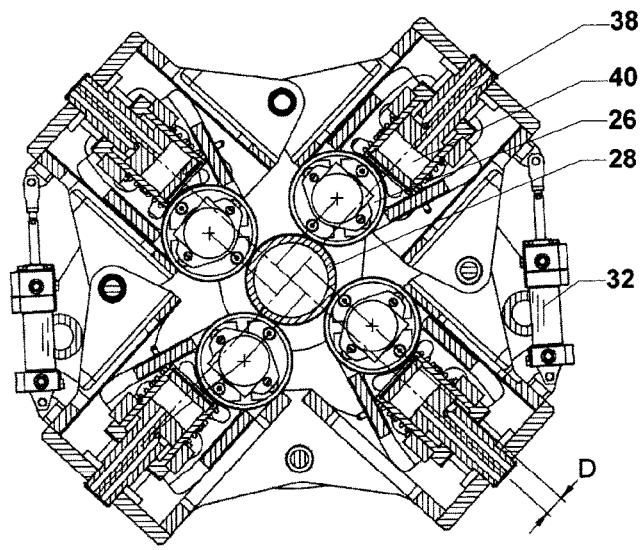
FIG. 4A depicts a, top, sectional view of an embodiment of a spinner wrench with radially positioned, self-actuated pivoting rams, where the pipe is depicted.
Figure 4C:
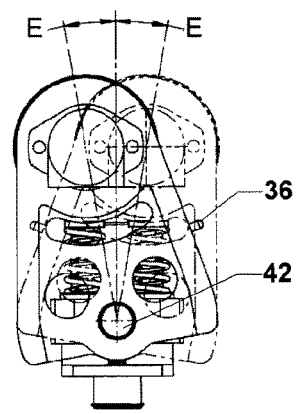
FIG. 4C depicts a sectional view of an embodiment of the self-actuated pivoting rams of FIG. 4A and FIG. 4B.
Figure 4B:
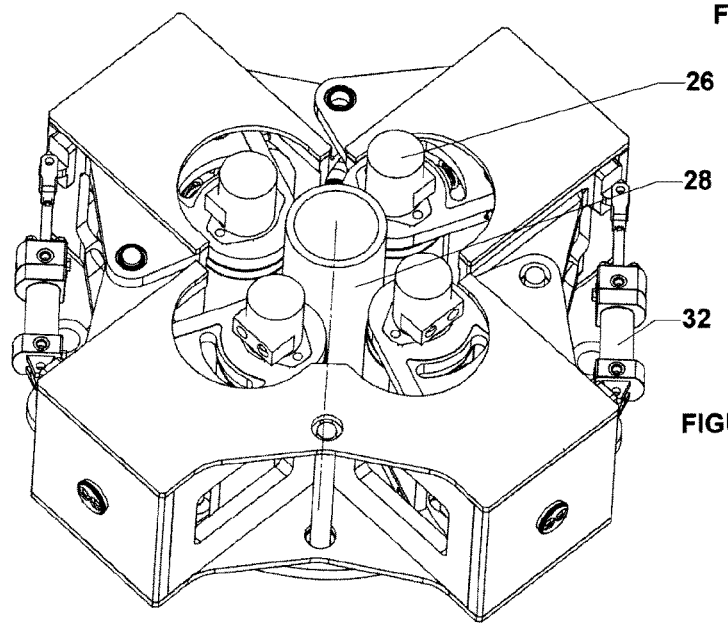
FIG. 4B depicts an isometric view of an embodiment of the spinner wrench of FIG. 4A.

Referring now to FIGS. 4A, 4B, and 4C, an embodiment of spinner wrench 10 is shown which can be similar in most aspects to the one shown in FIGS. 3A and 3B. However, in this embodiment at least one hydraulic-ram assembly 34 and roller assembly 24 can pivot at pivot point 42 thus assuming either counter-clock-wise or clock-wise offset. For example, see pivoted offset represented by character E in FIG. 4C. In some embodiments, the pivoting motion can be passive in the absence of dedicated actuators to provide the motion. In some embodiments, the pivoting motion can be achieved by powering the rollers 26 in the desired direction of rotation at the time of rollers 26 touching against the drill-pipe 28. Counter-clock-wise rotation of rollers 26, which is used for make-up of a pipe connection, can provide for natural movement of ram-and-roller assembly 24, 34 in a counter-clock-wise direction around the pipe 28. Conversely, clockwise rotation of rollers 26, which is used for break-out of a pipe connection, can provide for natural movement of ram-and-roller assembly 24, 34 in a clock-wise direction. FIG. 4C depicts a sectional view of an embodiment of a pivoting ram-and-roller assembly 24, 34.

Figure 5A:
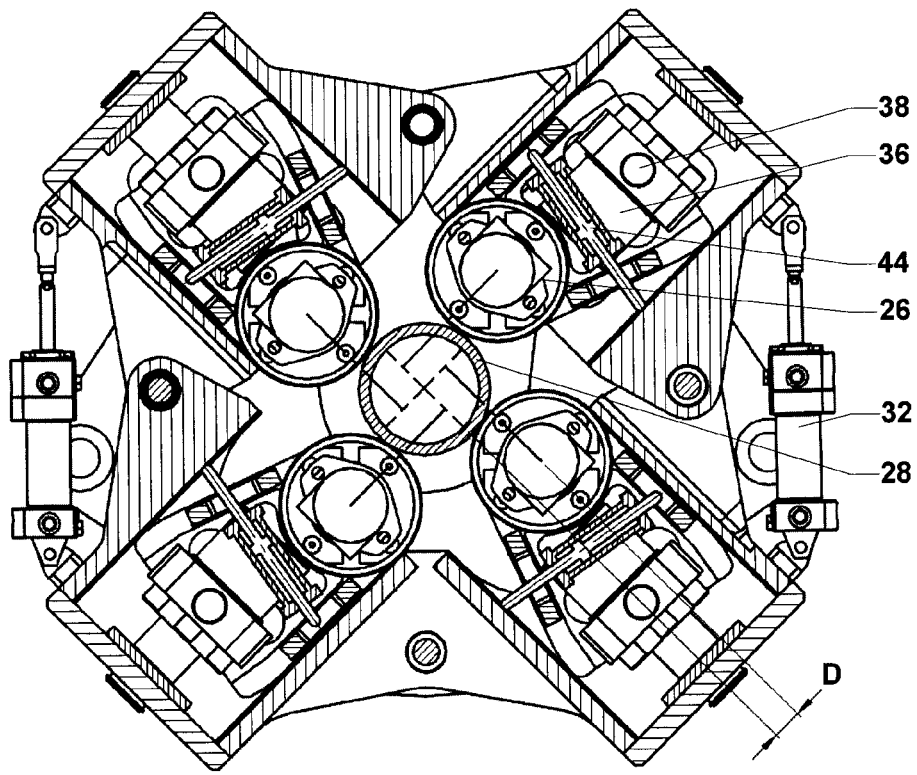
FIG. 5A depicts a, top, sectional view of an embodiment of a spinner wrench with hydraulically actuated pivoting rams, where the pipe is depicted.
Figure 5B:
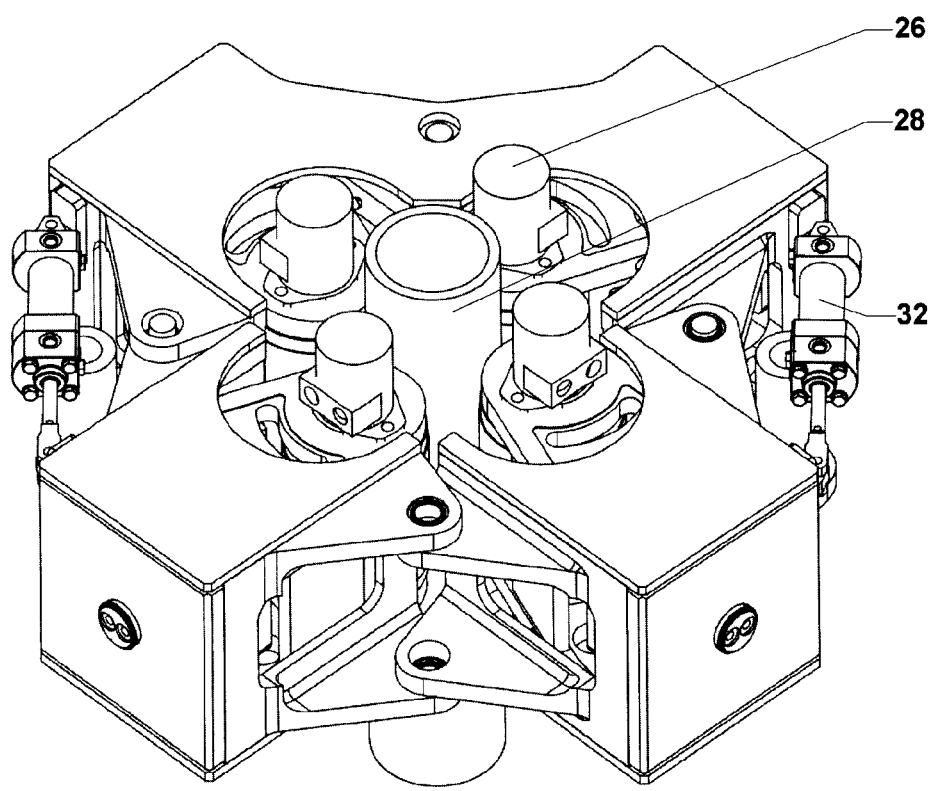
FIG. 5B depicts an isometric view of an embodiment of the spinner of FIG. 5A.

Referring now to FIGS. 5 and 5A, an embodiment of spinner wrench 10 is shown which can be similar in most aspects to the one shown in FIGS. 4 and 4A. However, in this embodiment the pivoting motion of ram-and-roller assemblies can be achieved by dedicated actuators 44.

Figure 6:
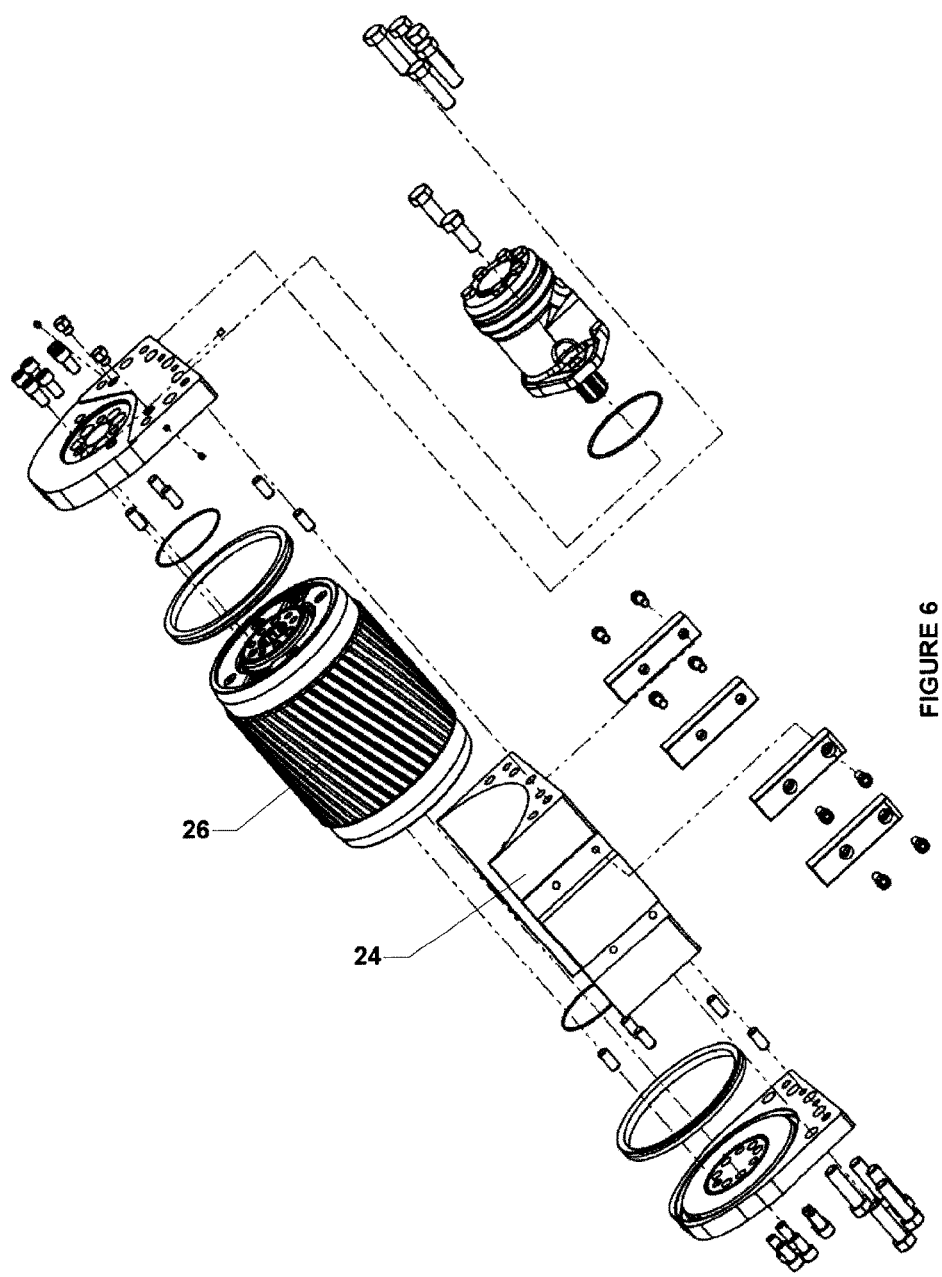
FIG. 6 depicts an exploded isometric view of an embodiment of a roller to be used with a spinner wrench. Dashed lines indicate the interconnections of components during assembly.

By extending ram 34, rollers 26 can be pushed towards each other. By retracting ram 34, rollers 26 can be moved away from each other. Referring to FIG. 6, an embodiment of roller 26 and roller assembly 24 is shown. In some embodiments, roller 26 can comprise hydraulic motor operatively coupled to gearbox, which can be further configured to receive roller tread and is removably mounted thereon. In some embodiments, an integrated roller-gearbox, such as those described in U.S. 61/928,863, hereby incorporated by reference in its entirety, can be used and attached to a drive motor. It would be understood that gearboxes of similar functions can be used in some embodiments.

In operation, spinner wrench 10 can be used to grasp a section of drill pipe 28 by extending ram 34, so as to contact the drill pipe 28 with rollers 26, and rapidly spin the drill pipe 28. All rollers 26 can be operated to spin the drill pipe relative to another section of pipe disposed below spinner wrench 10 and in some cases held by a tong assembly. Spinner wrench 10 can be used to spin the upper drill pipe clockwise prior to making a joint with the lower drill pipe, or to spin the upper drill pipe counter-clockwise after breaking a joint with the lower drill pipe. By incorporating a plurality of rollers 26 that can rotate the drill pipe 28, spinner wrench 10 can quickly start threading the drill pipe 28 sections together prior to torqueing them together with a tong assembly to make the joint, or quickly unthread the drill pipe sections apart after the joint is broken, for example, with a tong assembly. It would be understood that the reverse motions can be applied in the case of reverse threads.

A person skilled in the art will understand that the clamping force (Fcl) acting along the line connecting the centers of the drill-pipe 28 and the roller 26 can directly influence the amount of torque that can be transferred from the roller 26 to the drill-pipe 28. Making reference to FIG. 7, it can be seen that, for the given clamping force developed in the hydraulic ram, the piston force (Fp), this force Fcl can be increased by offsetting the ram relative to the drill-pipe 28 axis thus making the force Fp non-collinear with the line connecting the centers of the drill-pipe 28 and the roller 26. For clarity purposes only, force Fcl can be called the "Static Clamping Force".

Figure 7:
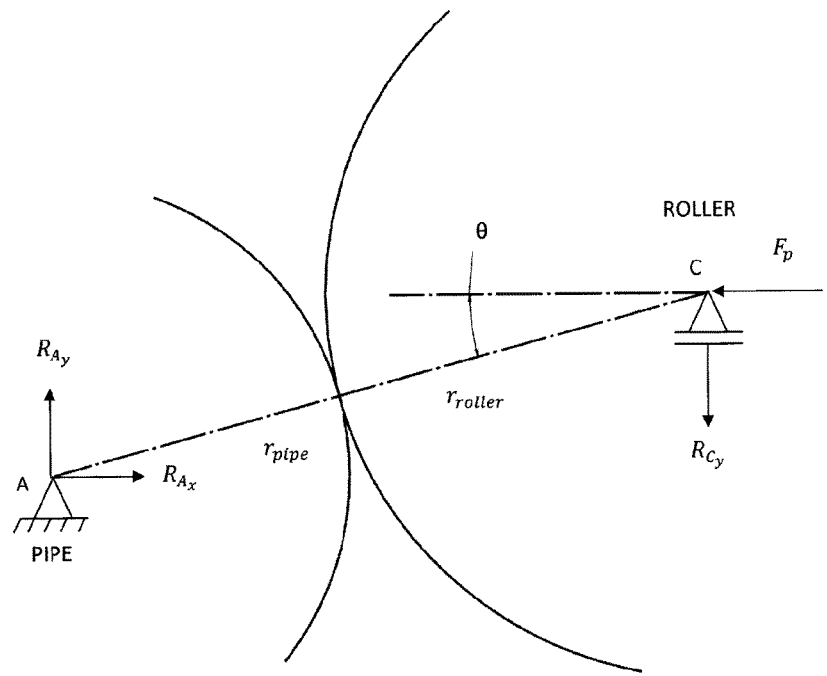
FIG. 7 depicts a schematic representation of clamping and reactive forces in a roller-to-pipe contact.

In FIG. 7:

$$L = r_{pipe} + r_{roller}$$

$$\Sigma M_A = 0 \rightarrow F_p L \sin\theta = R_{Cy} L \cos\theta$$

$$R_{Cy} = F_p(\sin\theta/\cos\theta) = F_p \tan\theta$$

For $0° < \theta < 90°$:

$$F_{cl} = [F_p^2 + R_{Cy}^2]^{1/2} = [F_p^2 + (F_p \tan\theta)^2]^{1/2} > F_p$$

Where:
L=Center Distance Between Roller & Pipe
$r_{pipe}$=Pipe Radius
$r_{roller}$=Roller Radius
$M_A$=Moment Acting At Point "A"
$F_p$=Piston Force $\theta$=Angle Between Line of Action and The Horizontal
$R_{Cy}$=Roller Reaction Force In Vertical Y Direction
$F_{cl}$=Clamping Force
$R_{Ay}$=Y Component of The Pipe's Reaction Force Due To Roller Clamping
$R_{Ax}$=X Component of The Pipe's Reaction Force Due To Roller Clamping Referring now to FIG. 8, we can see that, in a traditional prior art spinner wrench embodiment where two rollers are actuated by a single ram, the tangential force ($F_T$) produced by active torque of one roller will produce a dynamic component that is in the direction of the Static Clamping Force while the active torque of the other roller will produce a dynamic component that is in the direction opposite from the Static Clamping Force. Accordingly, the Dynamic Clamping Force of one roller can be higher than the Dynamic Acting Force of the other roller. Accordingly, the roller with lower Active Clamping Force can be the limiting factor on how much torque can be transferred from the rollers to the drill-pipe.

Figure 8A:
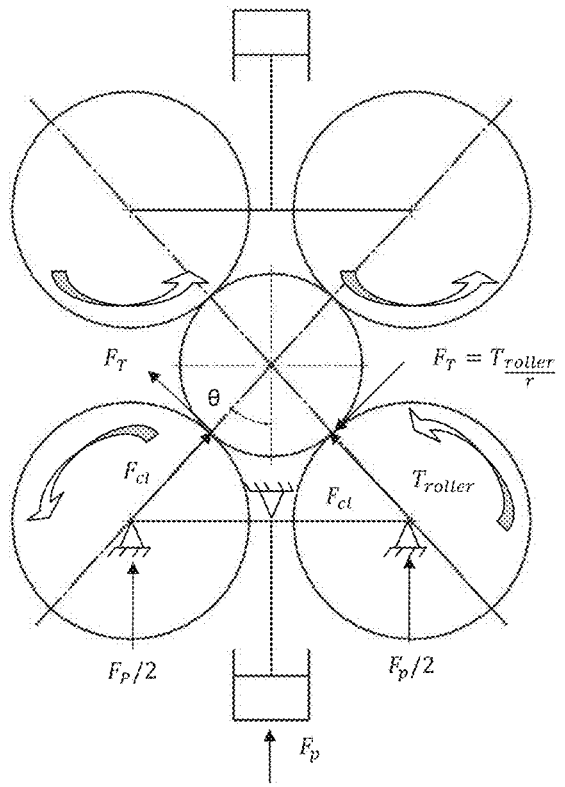
FIGS. 8A and 8B depict schematic representations of clamping and active forces in a prior art spinner wrench embodiment with two opposing rams, each acting on a pair of rollers.

In FIG. 8A:

$$F_T = T_{roller}/r$$

Figure 8B:
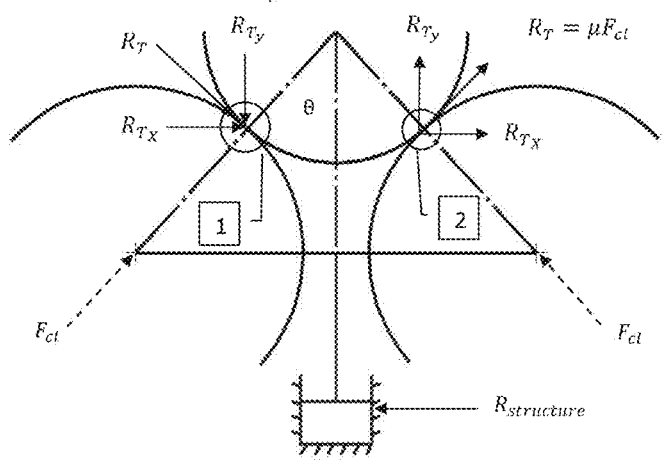

In FIG. 8B:

$$2R_{T_x} = R_{structure}$$

In contact area '1':

$$F_{cl_{dynamic_1}} = F_{cl} - R_{Ty}\cos\theta$$

In contact area '2':

$$F_{cl_{dynamic_2}} = F_{cl} + R_{Ty}\cos\theta$$

Figure 9A:
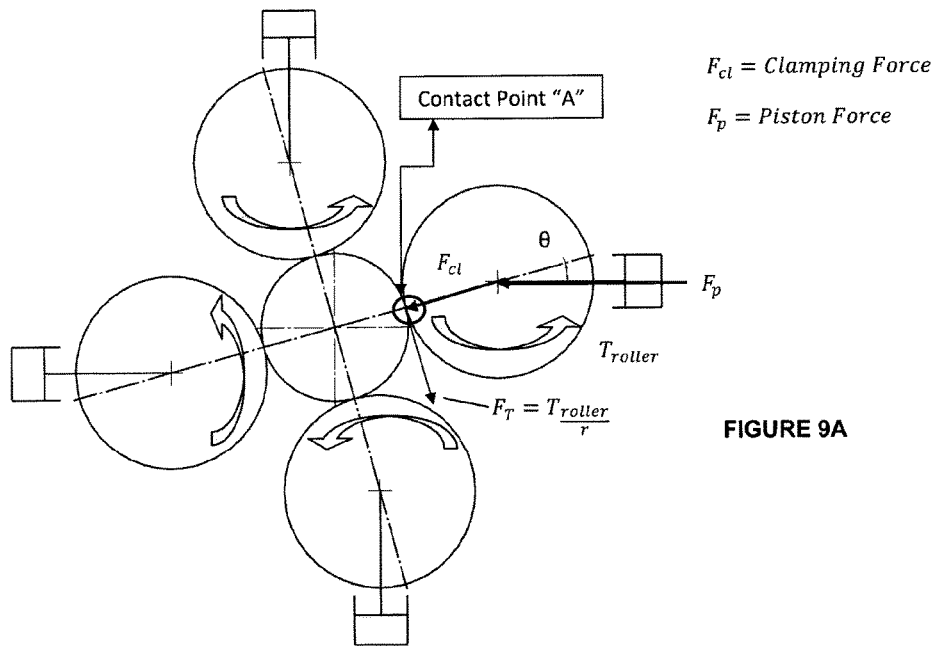
FIGS. 9A and 9B depict schematic representations of clamping and active forces in an embodiment of a spinner wrench with rollers energized by individual dedicated rams disposed for make-up of a pipe-connection.

Where:
$F_T$=Tangential Force of Roller Acting On Pipe
$T_{roller}$=Roller Torque
$R_{Ty}$=Y Component of the Pipe's Reaction Force of Roller Due To Torquing Pipe
$R_{Tx}$=X Component of the Pipe's Reaction Force of Roller Due To Torquing Pipe Referring now to FIG. 9, it can be seen that, by employing individual rams for clamping each roller, such as described in the present disclosure, and by offsetting all those rams in the same, appropriate direction, the active component of the clamping force can always act in favorable direction. As shown in FIG. 9, the rollers are offset in the counter-clockwise direction which can produce favourable dynamic effect when making-up a pipe connection. In some embodiments, rollers offset in the clock-wise direction can produce favourable dynamic effect during break-out.

Figure 9B:
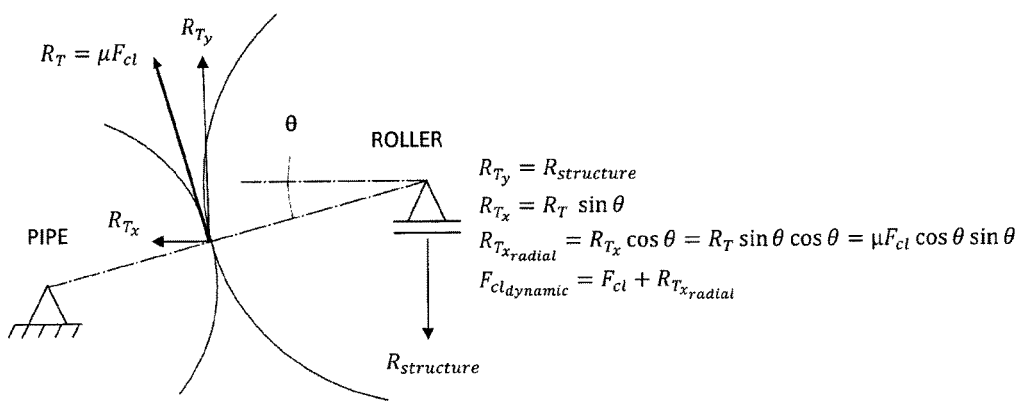

In FIG. 9B:

$$R_{Ty} = R_{structure}$$

$$R_{Tx} = R_T \sin\theta$$

$$R_{Txradial} = R_{T_x} \cos\theta = R_T \sin\theta \cos\theta = \mu F_{cl} \cos\theta \sin\theta$$

$$F_{Cl_{dynamic}} = F_{cl} + R_{Txradial}$$

Where:
$R_{Txradial}$=Dynamic Radial Reaction Force
$F_{Cl_{dynamic}}$=Total Dynamic Clamping Force On The Pipe
$R_T$=Resultant Tangential Reaction Force of The Pipe Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A spinner wrench for use to spin a drill pipe or other tubular, the wrench comprising:
    three or more powered rollers;
    each of the rollers configured to be pushed into contact with the drill pipe or other tubular by a dedicated ram;
    axes of the dedicated rams being in a plane perpendicular to an axis of the drill pipe but not intersecting the axis of the drill pipe or other tubular; and
    the rollers disposed in such a way that the contact between each powered roller and the drill pipe or other tubular is offset of the respective ram axis.

2. The spinner wrench as set forth in claim 1 where the ram axes are fixedly determined at manufacturing and are offset in such a way to provide a counter clockwise arrangement.

3. The spinner wrench as set forth in claim 1 where the ram axes are fixedly determined at manufacturing and are offset in such a way to provide a clockwise arrangement.

4. The spinner wrench as set forth in claim 1 where the ram axes are pivotable around axes parallel to the axis of the drill pipe or other tubular and thus configured to assume either a counter clockwise or a clockwise arrangement in relation to the axis of the drill pipe or other tubular.

5. The spinner wrench as set forth in claim 4 where the pivoting movement is allowed by design and initiated by friction between the spinning roller and the drill pipe or other tubular.

6. The spinner wrench as set forth in claim 4 where the pivoting movement is initiated by a dedicated actuator.

7. The spinner wrench as set forth in claim 1, wherein the rollers are configured surround the drill pipe.

8. The spinner wrench as set forth in claim 1, further comprising a roller assembly which comprises a roller frame to mount the powered rollers, the roller frame configured for moving the powered rollers away from each other to receive a section of drill pipe or other tubular and for moving the powered rollers towards each other and contacting the section of drill pipe or other tubular to spin the drill pipe or other tubular.

9. The spinner wrench as set forth in claim 1, wherein each powered roller comprises a hydraulic motor operatively coupled to an input of a gearbox, and a roller wheel operatively coupled to an output of the gearbox for spinning the powered roller.

10. The spinner wrench as set forth in claim 1, further comprising a latch mechanism to releasably allow the rollers to surround the drill pipe or other tubular.

11. A method for spinning a drill pipe or other tubular, the method comprising:
    surrounding the drill pipe or other tubular with a spinning wrench, the spinning wrench comprising three or more powered rollers, each of the powered rollers configured to be pushed into contact with the drill pipe or other tubular by a dedicated ram, axes of the dedicated rams being in a plane perpendicular to a longitudinal axis of the drill pipe or other tubular but not intersecting the longitudinal axis of the drill pipe or other tubular;
    offsetting the axes of the dedicated rams prior to, or during, contact of at least one powered roller and the drill pipe or other tubular;
    extending at least one dedicated ram so as to contact at least one powered roller to the drill pipe or other tubular;
    activating at least one powered roller in contact with the drill pipe or other tubular; and
    spinning the drill pipe or other tubular using the rotation of the at least one powered roller.

12. The method as set forth in claim 11 further comprising spinning the drill pipe or other tubular to form a joint between sections of tubulars during make-up, or breaking a joint between sections of tubulars during break-out.

13. The method as set forth in claim 12 further comprising using a tong assembly for torqueing the joint together during make-up, or for uncoupling the joint during break-out.

14. The method as set forth in claim 11 wherein, in planar view, the axes of the dedicated rams are offset to a counter-clock-wise direction for make-up and to a clock-wise direction for break-out of the drill pipe or other tubulars.

15. The method as set forth in claim 11 wherein, in planar view, the axes of the dedicated rams are offset to a clock-wise direction for make-up and to a counter-clock-wise direction for break-out of the drill pipe or other tubulars having reverse threads.

16. The method as set forth in claim 11 wherein, each ram is configured to pivot around an axis parallel to the longitudinal axis of the drill pipe or other tubular.

17. The method as set forth in claim 11 further comprising feeding the drill pipe or other tubular into the spinner wrench from above or below.

18. The method as set forth in claim 11 further comprising opening the spinner wrench to position the spinner wrench around the drill pipe or other tubular.

19. The method as set forth in claim 18 wherein opening the spinner wrench comprises unlatching a latch on the spinner wrench and swinging at least one latching body away from a main body on a pivot pin.

20. The method as set forth in claim 19 further comprising closing the spinner wrench around the drill pipe or other tubular by swinging the at least one latching body towards the main body on the pivot pin.

* * * * *